United States Patent Office 2,998,321
Patented Aug. 29, 1961

2,998,321
SOLUTIONS OF TITANIUM AND ALUMINIUM SALTS
Arthur Wallace Evans, Nunthorpe, Middlesbrough, and Arthur Dolby Brown and Hugh Robert Roddam, Grimsby, England, assignors to British Titan Products Company Limited, Billingham, Durham, England, a company of Great Britain
No Drawing. Filed Feb. 3, 1958, Ser. No. 712,629
Claims priority, application Great Britain Feb. 8, 1957
15 Claims. (Cl. 106—286)

This invention relates to the preparation of an aqueous solution containing aluminium and titanium, each in the form of a water-soluble salt with a mineral acid, the solution being useful primarily as a means for coating titanium dioxide pigments or composites but being useful also for other purposes.

The invention, in its more important aspect, although not essentially limited thereto, is concerned with the preparation of an aqueous solution containing aluminium sulphate and titanium sulphate.

The attack of titaniferous materials by strong mineral acid is well-known and the opening up of ores such as ilmenite by treatment with hydrochloric, hydrofluoric and especially sulphuric acid, has been well described. In the attack, particularly of ilmenite, with sulphuric acid, it is found to be necessary to employ an excess of acid beyond that required for the formation of the salts, ferrous or ferric sulphate and titanyl sulphate, $TiOSO_4$. This treatment is conducted more expeditiously because the ore and acid can be intimately mixed in a slurry prior to initiation of the reaction, and although after the attack the mass becomes viscous, this phase is quickly passed and the sulphated mass is obtained in a pulverulent condition. This desirable result is probably dependent upon the presence of the iron sulphate constituents, since when titanium dioxide alone is used, the attack is not so easily conducted.

In the preparation of titanium sulphate from titaniferous materials rich in $TiO_2$, the attack with sulphuric acid becomes a more difficult proposition, in that apart from other factors the resultant titanium sulphate is not so readily obtained in the form of a friable mass which is readily dissolved. In fact, unless the acid is in considerable excess the resultant mass is highly viscous and quickly tends to set, especially on cooling, to a hard glass.

In the preparation of a pure titanium sulphate solution the obvious choice of raw material is a hydrated titanium oxide which may be prepared from a crude titanium sulphate solution either by neutralisation or preferably by hydrolysis. Material of this description is generally of a very fine particle size and is more reactive when dried at a low temperature than when calcined. Hence, it is desirable either to work with the wet washed precipitated pulp or with this product when lightly dried. However initially prepared, in order to obtain an easy sulphation of this material, it is found necessary, in practice, to use an excess of acid far greater than is equivalent to titanyl sulphate and even greater than that which is normally required when sulphating an ore of the ilmenite type. In general, the minimum amount of acid required to obtain reasonable efficiency of sulphation, i.e. 90% or over, is not less than about 90% in excess of that required for the formation of titanyl sulphate. For convenience, in the description herein, this excess of sulphuric acid over the amount required to form titanyl sulphate will be referred to in terms of percentage free acid. On this basis, the amount of acid required to correspond to titanyl sulphate, $TiOSO_4$, will be represented by zero percentage free acidity (F.A.) and the amount required to correspond to titanic sulphate $(TiSO_4)_2$, will be represented by one hundred percent F.A. Thus, it is found in practice that to effect maximum attack of the titanium oxide raw material, sulphuric acid equivalent to at least 90% F.A. is required.

It is an important purpose of the present invention to produce, in a simple and economic manner, composite solutions of titanium and aluminium sulphate, the aluminium sulphate having its complement of acid corresponding to $Al_2(SO_4)_3$ and the excess acid in respect of the titanium content being not more than 80% F.A.

Broadly stated, the invention is a process for preparing an aqueous solution containing essentially aluminium and titanium, each in the form of a water-soluble salt with a mineral acid, which comprises first producing a solution containing the titanium and an excess of a mineral acid and then introducing into the solution aluminium in a form adapted to react with the mineral acid to form a water-soluble salt therewith.

More specifically and preferably, the process of the invention comprises dissolving titanium dioxide in an excess of strong sulphuric acid and thereafter adding hydrated aluminium oxide to the solution, each step being conducted at elevated temperatures. The description hereinafter will be related more particularly to this.

It is desirable to apply the invention to produce a solution containing both titanium and aluminium in a relative state of purity and, therefore, the employment of ilmenite as raw material on account of its impurities such as iron which would be soluble under acid attack would be unsuitable. The titanium dioxide should also exist in a relatively finely-divided state in order to facilitate its dissolution in the acid.

Advantageously, the starting-material may constitute titanium dioxide either in the form of pigment or as selected in the course of manufacture thereof. The more finely-divided material known as hydrated titanium dioxide which is obtained as a result of aqueous hydrolysis from sulphated solutions of titanium is particularly suitable for the purpose. In this form the material contains particulate matter of the order of about $.01\mu$ in the form of flocculated clusters easily disintegrated. While the invention is not entirely restricted to this product, the process will be described mainly in relation thereto. This hydrated titanium dioxide, which may be precipitated from sulphated solutions of titanium by known means, is filtered or otherwise separated from the supernatant liquors, washed, and, if necessary, dried at a relatively low temperature; it consists, in the filtered state, of an aqueous pulp containing approximately 37–40% (corresponding approximately to 550 g./l.) titanium dioxide and small quantities of adsorbed acid, not removable by washing, amounting to about 8–9% of the titanium dioxide by weight. More particularly:

Hydrated titanium oxide obtained by hydrolysis by well-known means as, for instance, precipitation from titanium sulphate solution and after suitable washing is brought into an aqueous slurry having concentrations up to about 550 g./l. $TiO_2$. This slurry may be used for the process of this invention as such or it may, according to preference, be dried, if preferred after prior neutralisation, at temperatures up to 400° C.; this material with a titanium dioxide content at approximately 75% or above, is sufficiently dry to be handled as a powder. Alternatively, the slurry may be diluted to provide concentrations of titanium dioxide lower than those given above and preferably of the order 300–450 g./l. which, as will be seen, will depend upon the proportion and the concentration of the acid with which the slurry is to react.

Other forms of hydrated titanium dioxide in a relatively purified condition may also be employed, as for instance, hydrated titanium dioxide obtained by precipitation from waste solutions of titanium either by heating to promote hydrolysis or by neutralisation with alkaline agents.

It will be appreciated that the process of the invention represents an economy of acid in the sulphation of the hydrated titanium oxide because this may be conducted with sufficient excess of acid to ensure substantially complete solution of the latter and this excess acid is then utilized for the dissolution of the aluminiferous starting material. In consequence, an unexpectedly small quantity of acid is employed in comparison with prior processes involving the simultaneous or completely separate preparation of the soluble titanium and aluminium sulphates. This may represent not only an economy of acid in preparation but can also represent a saving in, for instance, alkali or other basic substances required to neutralize the solution in its subsequent use for coating pigments.

A solution obtained according to the invention may be added to a slurry of finely ground titanium oxide pigment followed by the addition of an acid binding agent by which the titanium and aluminium constituents are precipitated in insoluble form on to the pigment, the product being separated, washed and dried. An alternative of this is the addition of the solution to a slurry prepared by dispersing a finely ground calcined titanium oxide pigment by means of a suitable dispersing agent which may be alkaline or acid reacting, although the former is the preferred, hydroseparating if desired and adding an acid binding agent by which the titanium and aluminium constituents may be precipitated on to the pigment, the product being separated, washed and dried. A further alternative is to mix the solution with an acid binding substance to precipitate the titanium and aluminium constituents and to add the mixture so attained to a slurry of titanium oxide pigment or a dispersed slurry of the pigment which may optionally be hydroseparated beforehand, the product being separated, washed and dried. It may here be mentioned in connection with such uses of the solution as have just been outlined, involving precipitation of the titanium and aluminium constituents with the aid of an acid binding agent, that under certain conditions, especially at elevated temperatures, the titanium constituent may precipitate by hydrolysis prior to the addition of the acid binding agent. This need not alter the subsequent procedure or affect the result: the amount of the acid binding agent required will be the same.

The sulphuric acid to be used in the process of the invention is a strong acid which may vary from 75% $H_2SO_4$ upwards and may include all strengths of oleum, providing that the latter can be suitably handled.

The aluminiferous material to be used in the process may be aluminium metal or aluminium compounds in a state adapted to produce a solution, in the mineral acid, that is sufficiently free from soluble impurities liable to cause discolouration in the subsequent use of the solution, the proportion of such impurities to be tolerated depending upon the use for which the solution is intended. Generally the preferred material is aluminium hydroxide or a hydrated alumina with varying degrees of moisture content and derived by extraction and purification of minerals such as bauxite or from other suitable well-known aluminium-containing material, which may include scrap metal. It will usually be a precipitated alumina which may be partially dried.

To ascertain whether the alumina, which will usually be a hydrated alumina containing 30 to 50% moisture, is suitable, after drying, for use in the process, it should comply with the following test: A sample of the alumina is mixed with 4.5 times its weight of sulphuric acid at a concentration of 25% volume-by-volume and heated under reflux for 90 minutes. If the solution so obtained contains more than 20% of undissolved alumina, the material is unsuitable.

In one method of performing the invention, a slurry containing preferably 300 to 400 g./l. of $TiO_2$ is treated with strong sulphuric acid, i.e. 95 to 97% sulphuric acid, the acid being added in a proportion which is in excess of that required to form titanyl sulphate, i.e. an amount which may vary from 2 to 13 molar parts by weight of sulphuric acid to 1 molar part of $TiO_2$ to give a resultant acid, if attack did not take place, of at least 55% $H_2SO_4$, with preferred proportions as will be more fully understood hereinafter. The heat of dilution of the sulphuric acid and the heat of reaction between the sulphuric acid and the titanium dioxide, whilst frequently adequate to initiate and maintain the reaction at the required temperature for a sufficient period of time, may yet, on account of heat losses, require to be augmented. Hence, provision may be made for the avoidance of excessive losses of heat, by employing suitable insulation or alternatively by the supply of additional heat which may be from an external source, i.e. by heating the containing vessel by well-known means, or by application of steam internally (which will react with the excess sulphuric acid to generate further heat).

Normally, the addition of the sulphuric acid to the titanium dioxide slurry will raise the temperature to approximately 140 to 150° C. Thereafter, following one method of heating, steam is applied in order to maintain the optimum temperature of the reaction mixture for a period of up to 40 minutes. During both the addition of the acid and in the steaming, when applied, agitation is maintained mechanically or by injection of air or, where applicable, by steam. Under these conditions, the titanium dioxide is attacked in such a way that usually from 85 to 100% is dissolved and normally the proportion which enters solution is from 90 to 99.5%. The time and temperature of the subsequent heating operation after the first addition of sulphuric acid will largely depend on the rate of solution of the titanium dioxide and will be varied accordingly by one skilled in the art. When the maximum amount of titanium dioxide has dissolved, the mass should comprise a solution or suspension which can be maintained in agitation and the solution should also contain a residue of acid over and above that required to form titanyl sulphate, which will be obvious from the proportions of reactants added and the degree of attack attained.

Whilst still maintaining the titanium solution in this hot agitated condition, hydrated alumina is added preferably over a period of 1 to 30 minutes, during which period the alumina undergoes solution. A longer period of addition is possible, but under these circumstances the application of some (external) heat may be required. The temperature at which this secondary reaction is conducted may vary over a wide range, i.e. approximately from 100° to 160° C., but for practical purposes it is preferable to operate within a narrower range of temperature and, as the bath after the addition of the titanium dioxide is at a temperature of about 130 to 160° C., the addition is normally made within this range. On occasion, due to the varying properties of the alumina, such as moisture content, some frothing may occur and this may necessitate a longer period of addition than would otherwise be required. The mixture is maintained in a state of agitation until solution of the alumina is substantially complete. This time-factor may vary up to 120 minutes during which period external heating may be applied and steam may be admitted to maintain the temperature above 110° C.—preferably at 130° C.

The mixture or suspension so obtained contains essentially all the titanium and aluminium in solution with an excess of acid which may vary in F.A. value from 0 to 80%. The temperature under these conditions is between 100 and 150° C. and preferably between 130 and 150° C. At this stage, the mass is diluted, by addition of water or of washings which may be recovered from a later stage of the process, preferably to a concentration of the order of 20 to 100 g./l. $TiO_2$. This dilution is preferably conducted rapidly, i.e. by quenching with water, in order to avoid the partial separation of dissolved salts in crystalline form from the sulphated mass or to avoid the mass becoming so viscous as to be unsuitable for normal agitation, which could result if cooling took place with the slow addition of water. The cooling or quenching operation is conducted with mechanical or air agitation and the water is added preferably over a period of 1 to 30 minutes. At this stage, the mixture has cooled and is suitable for the removal of any unattacked material. The solids in suspension may be removed by decantation, filtration or any other well-known means. The final solution thus obtained can be applied in the coating of pigments, e.g. titanium dioxide, or for other purposes involving the use of a solution containing both titanium and aluminium. The solids separated from the solution may, if substantial in quantity, be partially washed with water or weak acid. The washings containing recovered titanium or aluminium may be re-used in process, e.g. for the dilution step hereinbefore mentioned.

In performing the invention, it will be seen that there are wide limits for the preparation of such solutions containing titanium and aluminium. It will be appreciated that, where compartively small amounts of aluminium are required in the composite solution, the residual amounts of free acid will, of necessity be higher than where large proportions of aluminium to titanium are to be employed. Whilst there is no essential restriction on the proportion of aluminium to titanium used in the process, it is a purpose of the invention to produce solutions containing comparable proportions of these two elements and, in particular, it is intended to employ proportions of titanium dioxide to alumina, varying from 1:0.5 to 1:4 and preferably 1:0.8 to 1:2, the proportions being molar proportions of the oxides. It will naturally follow that one skilled in the art will adjust the sulphuric acid to be added to the titanium doxide in order that the amount of free acid after the addition of the alumina is maintained at a relatively low value, i.e. of the order of 0 to 80% F.A. and preferably 5 to 30% F.A., i.e. the excess acid over that required to form titanyl and aluminium sulphates, but these conditions are obviously dependent on the operator.

It will be obvious to one skilled in the art that the procedure that has just been described in some detail may be varied to attain similar results. For instance, instead of adding the sulphuric acid to the titanium dioxide slurry, the titanium slurry may be added to the sulphuric acid. Also, the titanium dioxide may be employed in a relatively dry, or even a powdery, condition, in which case it is desirable to add the titanium dioxide powder to an agitated sulphuric acid. Under such conditions, the strength of the acid added may obviously be varied over quite a wide range. Consequently it may be necessary where, for instance, the acid is highly concentrated or may be in the form of oleum, and also where the titanium dioxide is added in dry condition, that water or steam may have to be added, either at the time of addition of the reactants or separately according to the discretion of the operator. It will also be apparent that under certain conditions the mass, after attack, may prove to be very viscous, depending entirely on the proportion of excess acid employed with the titanium dioxide. It will be open to one skilled in the art either to employ larger excesses of acid or to dilute in order to avoid these excessive conditions of viscosity and thus facilitate proper agitation.

The proportion of impurities which enter solution will be determined to a large extent by the composition of the raw materials used in the process. At the same time, the tolerances which are permissible in the way of discolouring ions will depend entirely on the use to which the solution is eventually to be put. Of the undesirable constituents in the original raw materials, those that do not enter solution by attack with sulphuric acid, will not affect the ultimate result. It will be apparent from calculation that if, for instance, the solution is to be used for coating pigments and the amount of alumina which is to be added as a coating agent amounts to 1%, 100 parts of a soluble colouring impurity in the alumina (dry basis) will be equivalent to 1 part of the discolouring agent based on the final coated pigment. Thus, the tolerance for impurities in the raw materials may seemingly be higher than might at first be appreciated.

As already indicated, the invention is not limited to solutions prepared from sulphuric acid. There may be substituted other acids, for instance, hydrochloric, nitric, or hydrofluoric acids although in certain of these cases the economic factor would be decisive. Similarly, sulphuric acid may be replaced in part by other acids, or it may be substituted initially by starting, for instance, with titanium tetrachloride solution to which either the alumina may be added, or by adding sulphuric acid sufficient to augment the acid constituent thereof, the alumina then being dissolved in the residue of acid.

*Example*

The following is an illustration by way of example:

Hydrated titanium dioxide, derived by hydrolysis of titanium sulphate solutions used in the production of pigment and suitably washed, is introduced as an aqueous pulp having a concentration of 350 g./l. $TiO_2$ into a lead and tile-lined vat furnished with a mechanical agitator and means of injecting air through the bottom so as to amplify the agitation, if necessary, whilst the volume to be handled is small. The amount of hydrated titanium dioxide fed into the vat is 337 kg. calculated as $TiO_2$. The slurry is well-agitated by a stream of air admitted as aforesaid during 10 minutes, after which 1880 kg. of 95% sulphuric acid is run in over a further period of 10 minutes. The temperature rises to 148° C., thereafter being maintained at or around 150° C. for 15 minutes by injecting steam through an open pipe, located at the base of the vat. The amount of the hydrated titanium dioxide which thus enters into solution is about 97%. At this stage, the supply of steam is temporarily arrested and hydrated alumina having the analysis given below and amounting to 450 kg. (calculated as $Al_2O_3$) is introduced during 10 minutes, by means of a screw conveyor. Steam is again admitted, the temperature being maintained at around 135° C., for a further 40 minutes, after which substantially 98% of the aluminium content of the added hydrated alumina has dissolved. The mass is then mechanically agitated and water is introduced over a period of 15 minutes, to yield a concentration of 57 g./l. titanium dioxide. It is then filtered through a pre-coat type filter, which effects removal of the solids and results in a clean solution, having an F.A. value of 28% and low in impurities which would produce discolouration when the solution is neutralized or its contents precipitated as, for instance, on a pigment, e.g. titanium dioxide.

The hydrated alumina used in the process of this example has the following analysis:

| | Percent |
|---|---|
| $Al_2O_3$ | 65.1 |
| $Na_2O$ | 0.4 |
| $CaO$ | 0.06 |
| $SiO_2$ | 0.02 |
| $Fe_2O_3$ | 0.009 |
| Combined $H_2O$ | 34.3 |
| $SO_3$ | 0.08 |

As already indicated, one use of the solution obtained is for coating of titanium pigments. By the latter is to be understood titanium oxide or titanates or composite pigments containing titanium oxide in admixture with extenders such as barium sulphate or barium carbonate or in admixture with other pigments such as zinc oxide. The effect of such coating is to improve weathering properties of the pigments in various oil and resin media.

In conducting the coating, the acid binding substance may be selected from a wide group consisting of the alkali, alkaline earth, magnesium and ammonia hydroxides, oxides or carbonates where applicable. Various organic bases may also be employed. The degree of neutralisation effected may vary according to the requirements of the operator. Thus, a coating may be effected, leaving an acid pigment of pH 5 whereas an excess of alkaline agent may be employed, such agent in excess being either soluble or insoluble in water.

What is claimed is:

1. Process for preparing an aqueous solution of aluminium and titanium, each in the form of a water-soluble salt with sulphuric acid, which comprises dissolving finely-divided, hydrated titanium dioxide substantially free from acid-soluble coloring impurities in strong sulphuric acid of at least about 75% at a temperature above approximately 100° C., and thereafter adding finely-divided hydrated aluminium oxide substantially free from acid-soluble coloring impurities to the solution, to form, with acid in the solution, aluminium sulphate, the last named step being conducted at an elevated temperature between approximately 100° C. and 160° C.

2. Process according to claim 1 in which the hydrated titanium oxide is that obtained by precipitation from a titanium sulphate solution.

3. Process according to claim 1 in which the hot solution containing titanium and aluminium is quenched with water, whilst agitating.

4. Process for preparing an aqueous solution of titanium sulphate and aluminium sulphate which comprises first attacking finely-divided titanium dioxide, substantially free from acid-soluble colouring impurities, with an amount of sulphuric acid of at least 75% strength which is at least 90% in excess of the amount required for the formation of titanyl sulphate, and then, while maintaining a temperature between approximately 100 and 160° C. adding hydrated alumina, substantially free from acid-soluble colouring impurities, so as to dissolve it in the solution and to reduce the excess of acid with respect to the titanium content to an amount of from 0 to 80% in excess of the amount required for the formation of titanyl sulphate.

5. Process of claim 4 in which the excess of acid with respect to the titanium content after solution of the hydrated alumina is reduced to an amount of from 5 to 30% in excess of the amount required for the formulation of titanyl sulphate.

6. Process of claim 4 in which the titanium dioxide is hydrated titanium dioxide.

7. Process of claim 4 in which the titanium dioxide is hydrated titanium dioxide obtained by precipitation by hydrolysis from a titanium sulphate solution.

8. Process of claim 4 in which the titanium dioxide is titanium dioxide pigment.

9. Process for preparing an aqueous solution of titanium sulphate and aluminium sulphate, in which an aqueous slurry containing 300 to 400 g./l. of $TiO_2$, substantially free from acid-soluble colouring impurities, is treated with 95 to 97% sulphuric acid, the acid being added in an amount of from 2 to 13 molar parts by weight of sulphuric acid to 1 molar part of $TiO_2$, the temperature being maintained approximately within the range of 140 to 150° C., and thereafter dissolving hydrated alumina, substantially free from acid-soluble colouring impurities, in the titanium solution with maintenance of the temperature between approximately 100 and 160° C.

10. Process of claim 4 in which the hot solution containing titanium and aluminium is quenched with water, whilst agitating.

11. Process of claim 4 in which the proportion of titanium to aluminium, calculated as the molar proportion of their oxides, is from 1:0.5 to 1:4.

12. Process of claim 4 in which the proportion of titanium to aluminium, calculated as the molar proportion of their oxides, is from 1:0.8 to 1:2.

13. An aqueous solution of titanium and aluminium sulphates wherein the titanium sulphate is obtained by dissolving hydrated titanium oxide in sulphuric acid of at least 75% strength to produce a solution containing at least 55% $H_2SO_4$ and wherein sulphuric acid is at least 90% in excess of the amount required for the formation of titanyl sulphate, with hydrated alumina dissolved therein to reduce the excess acid to an amount of from 0 to 80% in excess necessary for the formation of titanyl sulphate, the solution being substantially free from acid-soluble impurities.

14. Process for preparing an aqueous solution of titanium and aluminium sulphates which comprises first attacking the finely divided titanium oxide which is substantially free from acid soluble colouring impurities with sulphuric acid of at least 75% strength which is at least 99% in excess of the amount required to form titanyl sulphate, and subsequent thereto while maintaining the titanium in solution and the temperature of the mass between approximately 100 and 160° C., adding hydrated alumina substantially free from acid soluble colouring impurities, the mass remaining in a fluid state throughout.

15. Process of claim 14 in which the titanium dioxide and the alumina have both been produced by hydrolysis.

References Cited in the file of this patent

UNITED STATES PATENTS

| | | |
|---|---|---|
| 2,092,132 | Monk et al. | Sept. 7, 1937 |
| 2,671,031 | Whately | Mar. 2, 1954 |